(12) United States Patent
Kumabe et al.

(10) Patent No.: US 11,275,180 B2
(45) Date of Patent: Mar. 15, 2022

(54) POSITIONING DEVICE AND POSITIONING METHOD

(71) Applicant: DENSO CORPORATION, Kariya (JP)

(72) Inventors: Seigou Kumabe, Kariya (JP); Watanyoo Chitmant, Kariya (JP)

(73) Assignee: DENSO CORPORATION, Kariya (JP)

( * ) Notice: Subject to any disclaimer, the term of this patent is extended or adjusted under 35 U.S.C. 154(b) by 121 days.

(21) Appl. No.: 16/723,496

(22) Filed: Dec. 20, 2019

(65) Prior Publication Data

US 2020/0124739 A1 Apr. 23, 2020

Related U.S. Application Data

(63) Continuation of application No. PCT/JP2018/012619, filed on Mar. 28, 2018.

(30) Foreign Application Priority Data

Jul. 7, 2017 (JP) .............................. JP2017-133973

(51) Int. Cl.
*G01S 19/22* (2010.01)
*G01S 19/42* (2010.01)
*G01S 19/28* (2010.01)
G01S 19/33 (2010.01)
G01S 19/25 (2010.01)
G01S 19/51 (2010.01)

(52) U.S. Cl.
CPC ............ *G01S 19/428* (2013.01); *G01S 19/22* (2013.01); *G01S 19/28* (2013.01); *G01S 19/42* (2013.01); *G01S 19/254* (2013.01); *G01S 19/33* (2013.01); *G01S 19/51* (2013.01)

(58) Field of Classification Search
CPC ........ G01S 19/28; G01S 19/115; G01S 19/22; G01S 19/254; G01S 19/51; G01S 19/42; G01S 19/00; G01S 19/428
USPC .............. 342/357.67, 357.2, 357.25, 357.61, 342/357.34
See application file for complete search history.

(56) References Cited

U.S. PATENT DOCUMENTS

| | | | | |
|---|---|---|---|---|
| 7,728,768 B2 * | 6/2010 | Mitsunaga | .............. | G01S 19/22 342/357.61 |
| 7,817,086 B2 * | 10/2010 | Sugimoto | ............... | G01S 19/20 342/357.25 |
| 7,884,759 B2 * | 2/2011 | Mitsunaga | .............. | G01S 19/22 342/357.25 |

(Continued)

FOREIGN PATENT DOCUMENTS

| | | |
|---|---|---|
| JP | 2013108961 A | 6/2013 |
| JP | 2016020812 A | 2/2016 |
| JP | 2016142553 A | 8/2016 |

*Primary Examiner* — Chuong P Nguyen
(74) *Attorney, Agent, or Firm* — Harness, Dickey & Pierce, P.L.C.

(57) ABSTRACT

A positioning device receives positioning signals from multiple positioning satellites respectively provided by multiple positioning systems, selects one or more use systems to be used in a positioning calculation processing among the multiple positioning systems based on a determination of whether a surrounding environment is an environment in which a multipath is likely to occur, and performs the positioning calculation processing by using the positioning signals from the positioning satellites provided by the positioning systems selected as the use systems.

10 Claims, 8 Drawing Sheets

(56) References Cited

U.S. PATENT DOCUMENTS

| | | | | |
|---|---|---|---|---|
| 7,924,219 | B2* | 4/2011 | Mizuochi | G01S 19/32 |
| | | | | 342/357.2 |
| 7,965,229 | B2* | 6/2011 | Mizuochi | G01S 19/40 |
| | | | | 342/357.23 |
| 8,068,055 | B2* | 11/2011 | Yoshioka | G01S 19/42 |
| | | | | 342/357.67 |
| 8,154,447 | B2* | 4/2012 | Uchida | G01S 19/258 |
| | | | | 342/357.67 |
| 8,217,832 | B2* | 7/2012 | Thomson | G01S 19/09 |
| | | | | 342/357.43 |
| 8,670,927 | B2* | 3/2014 | Watanabe | G01S 19/42 |
| | | | | 701/412 |
| 10,365,109 | B2* | 7/2019 | Kumabe | G01C 21/165 |
| 10,732,299 | B2* | 8/2020 | Kumabe | G01S 19/52 |
| 2016/0223680 | A1 | 8/2016 | Gobara et al. | |
| 2018/0252818 | A1* | 9/2018 | Sato | G01S 19/08 |
| 2020/0110182 | A1* | 4/2020 | Kumabe | G01S 19/115 |

* cited by examiner

POSITIONING DEVICE AND POSITIONING METHOD

CROSS REFERENCE TO RELATED APPLICATIONS

The present application is a continuation application of International Patent Application No. PCT/JP2018/012619 filed on Mar. 28, 2018, which designated the U.S. and claims the benefit of priority from Japanese Patent Application No. 2017-133973 filed on Jul. 7, 2017. The entire disclosures of all of the above applications are incorporated herein by reference.

TECHNICAL FIELD

The present disclosure relates to a positioning device and a positioning method.

BACKGROUND

Conventionally, a known positioning device performs a positioning calculation processing using multiple positioning signals transmitted from multiple positioning satellites configuring a global navigation satellite system (GNSS).

SUMMARY

According to an aspect of the present disclosure, multiple positioning signals are received from multiple positioning satellites respectively provided by multiple positioning systems, one or more use systems to be used in a positioning calculation processing are selected among the positioning systems based on a determination of whether a surrounding environment is an environment in which a multipath is likely to occur, and the positioning calculation processing is performed by using the positioning signals from the positioning satellites provided by the positioning systems selected as the use systems.

BRIEF DESCRIPTION OF DRAWINGS

Objects, features and advantages of the present disclosure will become apparent from the following detailed description made with reference to the accompanying drawings. In the drawings.

DETAILED DESCRIPTION

Figure 1:
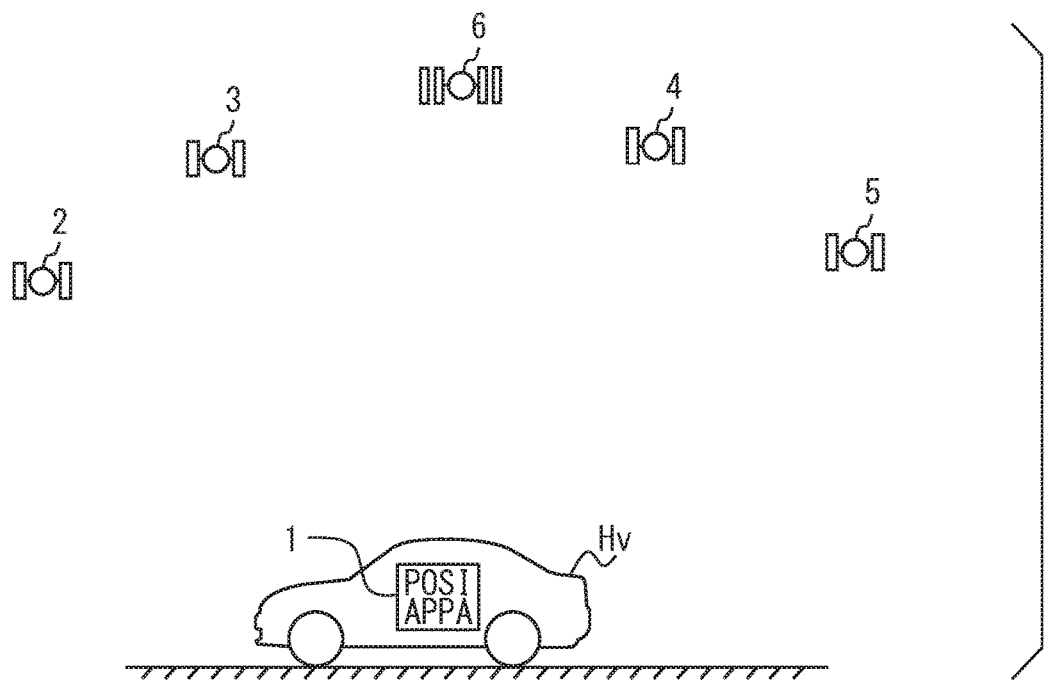
FIG. 1 is a diagram showing an example of a use mode of a positioning device.

In many cases, a positioning device is configured to perform a positioning calculation processing using observation data (for example, pseudo distance) of all positioning satellites from which positioning signals can be captured. This is because as the number of positioning satellites used in the positioning calculation processing increases, an improvement in positioning accuracy can be expected.

Further, in order to increase the number of positioning satellites available for a positioning calculation processing, a positioning device may be configured to calculate a current position by using GNSS positioning signals provided by different providers. For example, a device (hereinafter referred to as a multi-GNSS positioning device) may be configured to perform a positioning calculation processing using both positioning signals transmitted from positioning satellites that configure United States Global Positioning System (GPS) and positioning signals transmitted from positioning satellites that configure Russian GLONASS. Systems corresponding to the GNSS include, for example, European Galileo and Chinese BeiDou in addition to United States GPS and GLONASS.

System using the positioning satellites include a regional navigation satellite system (RNSS) for providing services in a particular area. For convenience, in cases where GNSS and RNSS are not distinguished from each other, those systems will be referred to as positioning systems.

A positioning accuracy of GNSS is regional for each of the systems. For example, since GPS is a system centered on the United States, each positioning satellite has an elliptical orbit in which the height on the Northern Hemisphere side is relatively higher than the altitude on the Southern Hemisphere side in order to give priority to positioning accuracy on the Northern Hemisphere. As a result, the positioning accuracy of the Northern Hemisphere tends to be better than the positioning accuracy in the Southern Hemisphere because the positioning satellite having a large elevation angle is easily captured in the Northern Hemisphere.

Similarly, in other positioning systems, there are areas in which relatively high accuracy is obtained and areas in which the accuracy is relatively degraded depending on orbits of positioning satellites configuring the system. In other words, there are excellent areas and poor areas for each positioning system. It should be noted that there may be a positioning system in which there is no excellent area and the overall accuracy is not so excellent, instead of the absence of a particularly poor area.

The positioning accuracy of the positioning system naturally differs depending on the surrounding environment. Under a multipath environment, it is difficult for the positioning system to exhibit its original (in other words, maximum) positioning accuracy. The accuracy of the positioning system referred to in the present specification is an average positioning accuracy in an environment in which the original positioning accuracy of the positioning system is exhibited, for example, in an open sky environment.

In view of such circumstances, among the positioning systems supported by the multi-GNSS positioning device, superiority or inferiority of accuracy occurs depending on the area in which the multi-GNSS positioning device is used, and there exist a positioning system (hereinafter referred to as a first system) in which relatively accurate positioning results are easily obtained, and a second system, which is a positioning system with inferior accuracy compared to the first system. For example, in North America, GPS can easily obtain positioning results with higher accuracy than BeiDou. On the other hand, in Southeast Asia, the accuracy of GPS is relatively low, and Beidou provides positioning results with high accuracy.

As a result of various tests, the present inventors have found that, in a situation such as open sky in which positioning satellites belonging to the first system are sufficiently captured, if observation data of positioning satellites of the second system having a relatively large error is also used for a positioning calculation processing, a positioning accuracy may be lowered.

According to an aspect of the present disclosure, a positioning device includes a signal receiver, an index value calculator, a dispersion calculator, a satellite selector, an environment determiner, a system selector, and a positioning calculator. The signal receiver is configured to receive a plurality of positioning signals transmitted from a plurality of positioning satellites respectively provided by a plurality of positioning systems. The index value calculator is configured to sequentially calculate, as an index value for determining whether in a multipath environment, at least one of a Doppler shift amount and a pseudo distance of each of the positioning satellites based on each of the positioning signals received by the signal receiver. The dispersion calculator is configured to calculate an index value dispersion indicating a degree of variation of the index value calculated by the index value calculator for each of captured satellites which are the positioning satellites from which the signal receiver is capable of receiving the positioning signals. The satellite selector is configured to set a non-use satellite not to be used in a positioning calculation processing among the captured satellites based on the index value dispersion calculated by the dispersion calculator for each of the captured satellites. The environment determiner is configured to determine whether a surrounding environment is an environment in which a multipath is likely to occur based on a deletion rate which is a ratio of the number of the captured satellite set as the non-use satellite by the satellite selector to a total number of the captured satellites. The system selector is configured to select one or more use systems to be used in the positioning calculation processing from the positioning systems according to a determination result of the environment determiner. The positioning calculator is configured to perform the positioning calculation processing by using the positioning signals from the positioning satellites provided by the positioning systems selected as the use systems by the system selector among remaining satellites which are the captured satellites not set as the non-use satellite by the satellite selector.

According to another aspect of the present disclosure, a positioning device includes a processor and a memory. The memory stores instructions configured to, when executed by the processor, cause the processor to receive a plurality of positioning signals transmitted from a plurality of positioning satellites respectively provided by a plurality of positioning systems, sequentially calculate, as an index value for determining whether in a multipath environment, at least one of a Doppler shift amount and a pseudo distance of each of the positioning satellites based on each of the positioning signals that are received, calculate an index value dispersion indicating a degree of variation of the index value calculated for each of captured satellites which are the positioning satellites from which the positioning signals are received, set a non-use satellite not to be used in a positioning calculation processing among the captured satellites based on the index value dispersion calculated for each of the captured satellites, determine whether a surrounding environment is an environment in which a multipath is likely to occur based on a deletion rate which is a ratio of the number of the captured satellite set as the non-use satellite to a total number of the captured satellites, select one or more use systems to be used in the positioning calculation processing from the positioning systems according to a determination result of the surrounding environment, and perform the positioning calculation processing by using the positioning signals from the positioning satellites provided by the positioning systems selected as the use systems among remaining satellites which are the captured satellites not set as the non-use satellite.

According to another aspect of the present disclosure, a positioning method includes receiving a plurality of positioning signals transmitted from a plurality of positioning satellites respectively provided by a plurality of positioning systems, sequentially calculating, as an index value for determining whether in a multipath environment, at least one of a Doppler shift amount and a pseudo distance of each of the positioning satellites based on each of the positioning signals that are received, calculating an index value dispersion indicating a degree of variation of the index value for each of captured satellites which are the positioning satellites from which the positioning signals are received, setting a non-use satellite not to be used in a positioning calculation processing among the captured satellites based on the index value dispersion calculated for each of the captured satellites, determining whether a surrounding environment is an environment in which a multipath is likely to occur based on a deletion rate which is a ratio of the number of the captured satellite set as the non-use satellite to a total number of the captured satellites, selecting one or more use systems to be used in the positioning calculation processing from the positioning systems according to a determination result of the surrounding environment, and performing the positioning calculation processing by using the positioning signals from the positioning satellites provided by the positioning systems selected as the use systems among remaining satellites which are the captured satellites not set as the non-use satellite.

According to the above aspects, not all positioning systems supported by the positioning device are always used. The positioning systems to be used in the positioning calculation processing are selected according to the surrounding environment determined. Therefore, in an environment, such as an open sky environment, in which the final positioning accuracy is deteriorated with the use of a positioning signal from a positioning satellite belonging to a positioning system having a relatively poor positioning accuracy among the positioning systems supported by the positioning device, the positioning system having the relatively poor positioning accuracy is not used in the positioning calculation processing. In other words, according to the above configuration, a positioning result with higher accuracy can be output.

Embodiment

A positioning device 1 according to an embodiment of the present disclosure will be described with reference to the drawings. FIG. 1 is a diagram showing an exemplary schematic configuration of an entire system including a positioning device (POSI APPA) 1. The positioning device 1 successively measures a current position by receiving positioning signals transmitted from each of multiple positioning satellites 2 to 5 and a quasi-zenith satellite 6. The positioning device 1 is mounted on a vehicle Hv, and a positioning result (that is, current position information) of the positioning device 1 is used by various application software such as self-driving, route guidance, and the like.

The vehicle Hv may be a four-wheeled vehicle, a two-wheeled vehicle, a three-wheeled vehicle, or the like. The two-wheeled vehicle also includes a motorized bicycle. The vehicle Hv may be, for example, a construction vehicle, an agricultural work vehicle, or the like, which has a main purpose other than the movement of an occupant. The positioning device 1 may be mounted on a vehicle other than the vehicle. For example, the positioning device 1 may be mounted on a communication terminal portable by a user (hereinafter, mobile terminal), such as a smartphone, a tablet terminal, a wearable terminal, or the like.

The positioning device 1 can be used in any area in the world. As an example, a case in which the positioning device 1 is used in Japan will be assumed. Details of the configuration, functions, and the like of the positioning device 1 will be described later.

The positioning satellites 2 to 5 are artificial satellites configuring various global positioning satellite systems GNSS). For example, the positioning satellites 2 are artificial satellites (so-called GPS satellites) configuring GPS (Global Positioning System), and the positioning satellites 3 are artificial satellites configuring Galileo. The positioning satellite 4 is an artificial satellite configuring GLONASS, and the positioning satellite 5 is an artificial satellite configuring BeiDou. Although FIG. 1 shows only one positioning satellite configuring each positioning system, multiple positioning satellites may actually exist. For example, there are 30 or more positioning satellites 2 configuring the GPS. There are 20 or more positioning satellites 4 configuring GLONASS.

Hereinafter, when providers of various types of GNSS, such as GPS, Galileo, GLONASS, and BeiDou, are not distinguished from each other, GNSS is described simply as the positioning system. When the positioning satellites 2 to 5 included in the respective positioning systems are not distinguished from each other, the measuring satellites 2 to 5 are referred to as positioning satellites without reference.

Each of the positioning satellites sequentially (for example, every 50 milliseconds) transmits a signal (hereinafter, positioning signal) obtained by phase-modulating data indicating a transmission time or the like using a C/A code unique to each of the positioning satellites. In addition to the transmission time, the positioning signal indicates, for example, data indicating an error of the satellite clock, ephemeris data indicating the current position of the satellite itself, almanac data indicating general orbit information of all the positioning satellites, and the like. The various pieces of data are transmitted sequentially. Since the C/A code is unique to each positioning satellite, the C/A code functions as information indicating a transmission source. For convenience, a positioning satellite from which the positioning device 1 is capable of receiving positioning signals is also referred to as a captured satellite.

The quasi-zenith satellite 6 is an artificial satellite orbiting an orbit (a so-called quasi-zenith orbit) that stays above a specified area for a long time, including an area where the positioning device 1 is used (for example, Japan), and configures a quasi-zenith satellite system (QZSS). QZSS corresponds to an example of a regional navigation satellite system (RNSS).

The quasi-zenith satellite 6 is configured so as to be able to operate integrally with the GPS, and sequentially transmits positioning signals similar to the positioning signals transmitted by the positioning satellite 2 as the GPS satellite. Since the quasi-zenith satellites 6 function as the positioning satellites 2 in this manner, the positioning satellites described below include the quasi-zenith satellites 6 in addition to the positioning satellites 2 as GPS satellites. In addition, the positioning systems described hereinafter also include QZSS.

In addition to the positioning signal, the quasi-zenith satellite 6 transmits a correction signal indicating correction information for a predetermined positioning satellite 2 with the use of a satellite line. The correction information in the present specification is, for example, information indicating the precision satellite coordinates, clock error, phase bias, ionospheric correction amount, tropospheric correction amount, and the like of the target positioning satellite 2. The ionospheric correction amount is a parameter for correcting an influence of a delay in the ionospheric layer, such as a pseudo distance or an error in a carrier phase, which occurs according to the thickness of the ionospheric layer, for example. The tropospheric correction amount is a parameter for correcting an influence of a delay in the troposphere (for example, a pseudo distance or an error of a carrier phase). The correction signal transmitted by the quasi-zenith satellite 6 may be generated based on the data generated and transmitted by the center installed on the ground. The correction signal may be a signal similar to known SBAS reinforcement messages.

The positioning device 1 supports each of the multiple positioning systems such as GPS, Galileo, GLONASS, BeiDou, and QZSS, and is configured to be capable of performing a positioning calculation processing using positioning signals of multiple positioning systems in combination. The positioning device 1 is also configured to be able to perform positioning calculation using only signals from positioning satellites belonging to any one positioning system. Hereinafter, the configuration and functions of the positioning device 1 will be described with reference to FIG. 2.

Figure 2:
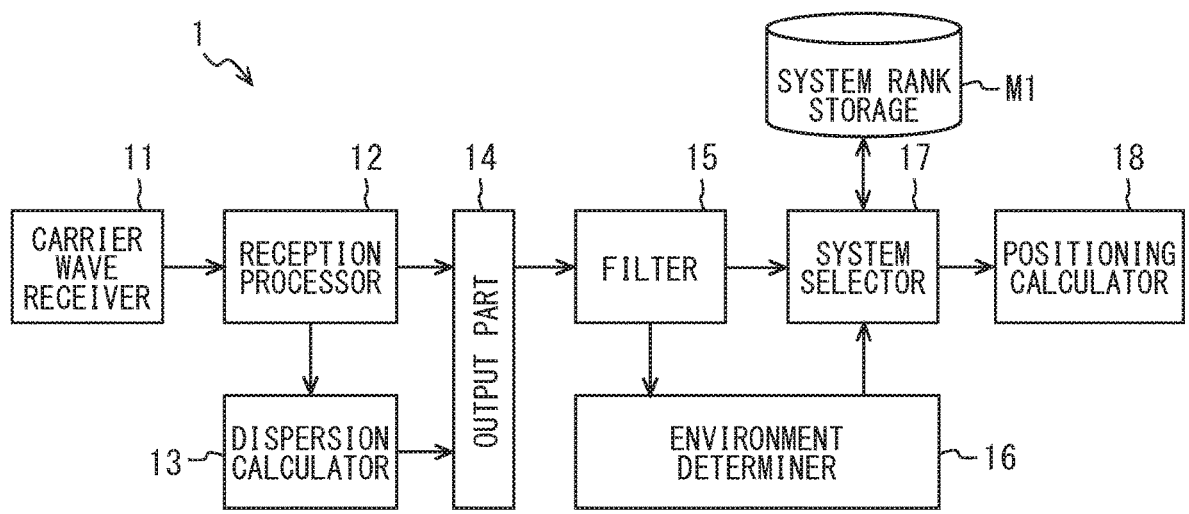
FIG. 2 is a block diagram showing an example of a schematic configuration of the positioning device.

As shown in FIG. 2, the positioning device 1 includes a carrier wave receiver 11, a reception processor 12, a dispersion calculator 13, an output part 14, a filter 15, an environment determiner 16, a system selector 17, and a positioning calculator 18. The positioning device 1 includes a system rank storage M1 realized by using a nonvolatile storage medium.

The reception processor 12, the dispersion calculator 13, the output part 14, the filter 15, the environment determiner 16, the system selector 17, and the positioning calculator 18 may be embodied by a CPU (not shown) executing a predetermined program (hereinafter, a positioning program). In that case, the positioning device 1 includes a CPU that executes various calculation processing, a flash memory that is a nonvolatile memory, a RAM that is a volatile memory, an I/O, a bus line that connects those components to each other, and the like.

The positioning program for causing a normal computer to function as the positioning device 1 may be stored in a non-transitory tangible recording medium (non-transitory tangible storage medium). For example, the positioning program may be stored in a ROM, a flash memory, or the like. Execution of the positioning program by the CPU corresponds to execution of a method corresponding to the positioning program.

In the present embodiment, as an example, the positioning device 1 includes the reception processor 12, the dispersion calculator 13, the output part 14, the filter 15, the environment determiner 16, the system selector 17, and the positioning calculator 18 as functional blocks realized by the CPU executing the positioning program (software), but the present disclosure is not limited to the above configuration. Part or all of the functional blocks described above may be implemented as hardware. A mode realized as hardware includes a mode realized by using one or multiple ICs or the like. Further, part or all of the functional blocks described above may be realized by cooperation of a CPU executing software and hardware members.

The system rank storage M1 is a storage device in which data (hereinafter, system rank data) indicating the ranking of the average positioning accuracy of each positioning system in the area (hereinafter referred to as a use area) in which the positioning device 1 is used is stored. Since Japan is assumed as a use area in this example, QZSS is registered in the system ranking storage M1 as the positioning system with the highest accuracy (hereinafter referred to as a first system). In addition, GPSs interoperable with QZSS are registered as the second most accurate positioning system (hereinafter referred to as a second system). It is assumed that Galileo is registered as the third most accurate positioning system (hereinafter referred to as a third system) and BeiDou is registered as the fourth most accurate positioning system (hereinafter referred to as a fourth system). GLONASS is registered as the fifth most accurate positioning system (hereinafter referred to as a fifth system).

Since the accuracy (strictly expected average accuracy) of each positioning system is regional as described above, the rank of each positioning system registered in the system rank storage M1 differs depending on the area. Thus, in other areas (for example, Singapore and China), BeiDou can be the first system. Also, since the average accuracy provided by the positioning system changes depending on an increase or decrease of the positioning satellites included in the positioning system, the accuracy of each positioning system can be changed over time even in the same area. The superiority and inferiority of the accuracy of each positioning system described above is merely an example. Which positioning system is used as the first and second systems or the like may be appropriately designed. For example, the accuracy of each positioning system in the open sky environment to be described later may be tested, and the first, second, . . . , and fifth systems may be determined in descending order of the positioning accuracy in the open sky environment. The first system corresponds to a high-accuracy system and the fifth system corresponds to a low-accuracy system.

The carrier wave receiver 11 is a communication module that receives radio waves as positioning signals transmitted from various positioning satellites, converts the radio waves into electrical signals, and outputs the electrical signals. The carrier wave receiver 11 includes an antenna for receiving positioning signals (hereinafter referred to as a GNSS antenna). The carrier wave receiver 11 may include multiple GNSS antennas each having a different frequency as an operation frequency. The carrier wave receiver 11 is configured to be receivable each positioning signal of the positioning systems supported by the positioning device 1.

In addition to at least one GNSS antenna, the carrier wave receiver 11 includes a frequency conversion circuit for converting a received signal into a baseband signal, an analog-to-digital converter for converting an analog signal output from the GNSS antenna into a digital signal, and the like. An amplifier circuit or the like may be provided. The carrier wave receiver 11 corresponds to a signal receiver.

The reception processor 12 is configured to generate observation data for the transmission source positioning satellite based on the positioning signal output from the carrier wave receiver 11. The observation data is data about a captured satellite determined according to the received positioning signal. As an example, it is assumed that the reception processor 12 generates and outputs data indicating a satellite number, an observation time, a Doppler shift amount, a pseudo distance, satellite coordinates, a carrier phase, and the like as observation data. The satellite number is information for distinguishing each of the multiple positioning satellites 2 from each other, and may be, for example, PRN (Pseudo Random Noise) IDs. The observation time may be a time at which the positioning signal for generating the observation data is received.

The Doppler shift amount is a parameter representing a difference between the carrier wave frequency and a reception frequency caused by the Doppler effect. The pseudo distance is a distance determined according to a difference between a time (hereinafter referred to as transmission time) at which the positioning signal is transmitted from the positioning satellite 2 and a time (hereinafter referred to as a reception time) at which the positioning signal is received by the reception processor 12. The difference between the transmission time and the reception time may be calculated based on a phase shift amount of a C/A code. The satellite coordinates are information indicating the current position of the positioning satellite in the satellite orbit.

It should be noted that the observation data does not need to include all of the above-mentioned information, and specific items to be included in the observation data may be appropriately designed. The observation data may include almanac data, ephemeris data used to calculate satellite coordinates, and the like. The observation data may include information necessary for the positioning calculation processing. The reception processor 12 includes a pseudo distance calculator for calculating a pseudo distance, a Doppler shift amount calculator, and the like as sub-functions for generating the observation data described above. The pseudo distance calculator and the Doppler shift amount calculator are not illustrated. As described above, the reception processor 12 having the functions of the pseudo distance calculator and the Doppler shift amount calculator corresponds to an index value calculator. The index value calculator calculates, as an index value, at least one of the Doppler shift amount and the pseudo distance, that is, only the Doppler shift amount, or only the pseudo distance, or both of the Doppler shift amount and the pseudo distance.

The reception processor 12 generates the observation data described above each time the carrier wave receiver 11 receives the positioning signal. As a result, observation data is sequentially generated for each positioning satellite (i.e., captured satellite) from which the positioning signal can be received. The observation data for each captured satellite generated by the reception processor 12 is output to the output part 14. The pseudo distance generated by the reception processor 12 is correlated with information (for example, satellite number) indicating which of the captured satellite the pseudo distances belongs to, and is output to the dispersion calculator 13.

The dispersion calculator 13 acquires the pseudo distance for the respective captured satellites sequentially provided from the reception processor 12, distinguishes the pseudo distance for the respective captured satellites, and stores the pseudo distance in a memory (not shown). The memory may be realized by using a rewritable storage medium such as a RAM. The multiple pseudo distances having different acquisition times for the same captured satellite may be sorted in chronological order and stored in the memory so that the latest data becomes the head, for example. In addition, the data that has been stored for a certain period of time may be discarded in order.

The dispersion calculator 13 calculates a pseudo distance dispersion indicating the degree of variation of the pseudo distance calculated (in other words, observed) within the most recent predetermined time period for each captured satellite. The pseudo distance dispersion for a certain captured satellite may be a standard deviation whose population is a pseudo distance calculated within a predetermined time (for example, 5 seconds) in the past from the current point in time. As another mode, other indices indicating the degree of variation of data in statistics, such as variance, a difference between a maximum value and a minimum value, and the like, can be adopted as the dispersion.

The pseudo distance dispersion for a certain captured satellite may be calculated when a new pseudo distance for the captured satellite is acquired. In addition, the dispersion calculator 13 may be configured to sequentially calculate the pseudo distance dispersion for each captured satellite in a predetermined cycle (for example, every 100 milliseconds).

As another embodiment, the dispersion calculator 13 may be configured to calculate a shift amount dispersion indicating the degree of variation of the Doppler shift amount calculated within the most recent predetermined time instead of the pseudo distance dispersion. In that case, the reception processor 12 may be configured to output the Doppler shift amount to the dispersion calculator 13 instead of the pseudo distance.

As another mode, the dispersion calculator 13 may be configured to calculate both the pseudo distance dispersion and the shift amount dispersion for each captured satellite. In that case, the reception processor 12 may be configured to sequentially output both the pseudo distance and the Doppler shift amount to the dispersion calculator 13.

In the case where the surrounding environment of the vehicle Hv is in a multipath environment, since the variation of the pseudo distances calculated sequentially becomes large, the pseudo distances function as an index value as to whether the surrounding environment is in a multipath environment. When the surrounding environment of the vehicle Hv is in a multipath environment, the arrival direction of the positioning signal may be sequentially changed. If the arrival direction is changed, the Doppler shift amount is also changed. In other words, when the surrounding environment of the vehicle Hv is in the multipath environment, the variation of the Doppler shift amount calculated sequentially becomes large, and thus the Doppler shift amount calculated sequentially also functions as an index value as to whether the surrounding environment is in the multipath environment. In other words, each of the pseudo distance and the Doppler shift amount corresponds to an index value. Each of the pseudo distance dispersion and the shift amount dispersion corresponds to an index value dispersion.

The pseudo distance dispersion calculated by the dispersion calculator 13 is output to the output part 14 in association with information (for example, satellite number) indicating which captured satellite the pseudo distance dispersion is for. The output part 14 outputs the observation data for the captured satellites input from the reception processor 12 and the pseudo distance dispersions for the captured satellites input from the dispersion calculator 13 to the filter 15.

The filter 15 deletes the observation data of the captured satellite whose pseudo distance dispersion is equal to or greater than a predetermined threshold (hereinafter referred to as a deletion threshold) from the observation data for the captured satellites. Then, the filter 15 outputs the observation data remaining after deleting the observation data of the captured satellite whose pseudo distance dispersion is equal to or greater than the deletion threshold to the system selector 17. In other words, the filter 15 is configured to filter the observation data for the captured satellites so that only the observation data for the captured satellite having a relatively small pseudo distance dispersion is used in the system selector 17 in the subsequent stage.

For convenience, a process of deleting the observation data of the captured satellite whose pseudo distance dispersion is equal to or greater than the deletion threshold from the observation data for the captured satellites is referred to as a filtering process. The filter 15 corresponds to a satellite selector. The captured satellites corresponding to the observation data remaining as a result of the filtering process are also referred to as remaining satellites.

It is to be noted that not outputting (that is, deleting) the observation data for a certain captured satellite to the subsequent stage processing corresponds to not using the captured satellite for the positioning calculation processing. In other words, the filter 15 corresponds to a configuration for determining a non-use satellite, which is a captured satellite that is not used in the positioning calculation processing, from among multiple captured satellites based on the pseudo distance dispersion for each captured satellite. In other words, the filter 15 corresponds to a configuration in which the captured satellites to be used in the positioning calculation processing are selected from among multiple captured satellites based on the pseudo distance dispersion for each captured satellite.

In addition, the filter 15 calculates a deletion rate R representing a ratio of the number of deleted observation data to the number of observation data input from the output part 14 (in other words, the total number of captured satellites). When the number of observation data input from the output part 14 is N and the number of deleted observation data is k, the deletion rate R is represented by k/N. When the number of observation data input from the output part 14 is N and the number of deleted observation data is k, the number M of observation data output to the system selector 17 is N-k. The filter 15 outputs data indicating the deletion rate R to the environment determiner 16.

The environment determiner 16 is configured to determine, based on the deletion rate R provided from the filter 15, whether the surrounding environment of the positioning device 1 is an environment in which there are a large number of features that block and scatter signals from the positioning satellites in a skyward field of vision (in other words, an environment in which multipath is likely to occur). Whether the multipath is likely to occur is determined according to a quality of a skyward view above the positioning device 1.

In the present embodiment, as an example, the surrounding environment is classified into four categories in stages according to the quality of a skyward view, and the environment determiner 16 determines which category of the categories the current surrounding environment corresponds to in accordance with the deletion rate R. Hereinafter, the four categories are referred to as a first category C1, a second category C2, a third category C3, and a fourth category C4 in the descending order of the quality of the skyward view. The first category C1 corresponds to an environment in which the quality of the skyward view is the best, and the fourth category C4 corresponds to an environment in which the quality of the skyward view is the worst.

When the quality of the skyward view is poor, the number of shields such as buildings and the like are greater, which means that the environment is likely to generate multipath. Further, when the multipath is more likely to occur, the pseudo distance dispersion becomes a relatively large value, as a result of which, the deletion rate R also becomes a relatively large value. Therefore, the environment determiner 16 determines that the surrounding environment corresponds to a category having a larger category number when the deletion rate R is larger.

Specifically, when the deletion rate R is less than a predetermined first deletion rate Rth1, the environment determiner 16 determines that the surrounding environment corresponds to the first category C1. A specific value of the first deletion rate Rth1 may be appropriately set by conducting a test. In this example, 10% is used as an example, but 5% or 15% or the like may be used. When the deletion rate R is equal to or greater than the first deletion rate Rth1 and less than a predetermined second deletion rate Rth2, it is determined that the surrounding environment corresponds to the category C2. A specific value of the second deletion rate Rth2 may be set as appropriate by conducting a test in a range larger than the first deletion rate Rth1, and in this example, the value is set to 30%.

When the deletion rate R is equal to or greater than the second deletion rate Rth2 and less than a predetermined third deletion rate Rth3, the environment determiner 16 determines that the surrounding environment corresponds to the third category C3. A specific value of the third deletion rate Rth3 may be set as appropriate by executing a test larger than the second deletion rate Rth2, and in this example, the value is set to 60%. When the deletion rate R is equal to or higher than the third deletion rate Rth3, it is determined that the surrounding environment corresponds to the fourth category C4.

Figure 3:
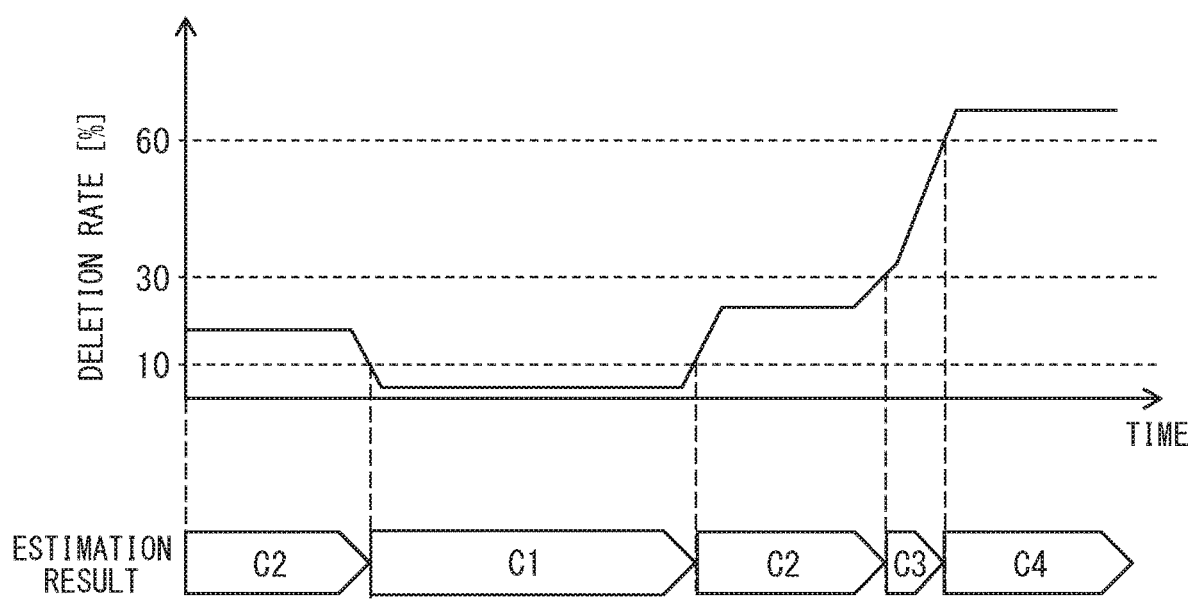
FIG. 3 is a diagram illustrating an operation of an environment determiner.

Every time the deletion rate R is input from the filter 15, the environment determiner 16 performs determination of the surrounding environment. Naturally, the surrounding environment transitions and the deletion rate R changes along with the traveling of the vehicle Hv. In other words, as shown in FIG. 3, the determination result of the environment determiner 16 also changes over time with the transition of the deletion rate R. The determination result of the environment determiner 16 is sequentially output to the system selector 17.

The environment indicated by each category is specifically as follows. The first category C1 is a category corresponding to a so-called open sky environment. Quantitatively, the open sky environment may be set to, for example, an environment in which a sky exposure ratio (in other words, a sky factor) when the sky is photographed by a fisheye camera is 80% or more. It is needless to say that an environment in which the sky exposure ratio is 75% or 85% or more may be defined as an open sky environment. When the positioning device 1 is present in the open sky environment, it is expected that the pseudo distance dispersion will be a relatively small value because the multipath is unlikely to occur, as a result of which the deletion rate R can also be expected to be a relatively small value. The first deletion rate Rth1 described above may be determined based on the test result of the deletion rate R in the open sky environment. In the open sky environment, there is a high possibility that positioning signals from the respective positioning satellites can be directly received without being reflected by buildings or the like. For that reason, the open sky environment is an environment in which positioning results with relatively high accuracy can be obtained. The first category C1 corresponds to the open sky category.

The second category C2 is a category indicating an area in which the number of structures such as buildings is relatively small among urban areas (in other words, a multipath is less likely to occur). For example, the second category C2 may correspond to an environment in which the sky exposure ratio becomes a relatively low value (for example, 65% or more and less than 80%).

The third category C3 is a category indicating an area in which there are relatively many structures such as buildings among urban areas (in other words, multipath is likely to occur). A criterion for dividing the second category C2 and the third category C3 may be appropriately determined based on the test result. For example, the third category C3 may correspond to an environment in which the sky exposure ratio becomes a relatively low value (for example, 50% or more and less than 65%). The fourth category C4 is a category indicating an urban area in which high-rise buildings and the like exist. For example, the fourth category C4 may be a category assuming an environment in which the sky exposure ratio is less than 50%. The fourth category C4 corresponds to an urban category.

In the present embodiment, the surrounding environment is classified into four stages of categories C1 to C4 according to the skyward field of view, but the present disclosure is not limited to the above case. The surrounding environment may be classified into two stages, three stages, or five stages. For example, the surrounding environment may be classified into two stages as to whether the environment is the open sky environment. In addition, the second category C2 and the third category C3 of the present embodiment are integrated into one category, so that the surrounding environment may be divided into three categories as a whole. Environments such as in forests, tunnel interiors, and so on may be added as categories.

The system selector 17 is configured to select a positioning system to be used in the positioning calculation processing based on the category of the surrounding environment determined by the environment determiner 16 and the system rank data registered in the system rank storage M1. Details of the operation of the system selector 17 will be described later with reference to FIG. 4 and the like.

In general, when it is determined by the environment determiner 16 that the surrounding environment is an environment in which the multipath is less likely to occur (that is, a category having a small number), only a positioning system with relatively high accuracy is selected as a positioning system to be used for the positioning calculation processing (hereinafter referred to as a use system). In other words, a positioning system having relatively poor accuracy is not set to the use system. On the other hand, when it is determined by the environment determiner 16 that the surrounding environment is an environment in which the multipath is likely to occur (that is, a category having a large number), a positioning system having relatively poor accuracy in the use area is also adopted as the use system.

The positioning calculator 18 performs the positioning calculation processing using observation data of positioning satellites belonging to the positioning system selected as the use system by the system selector 17. If the multiple positioning systems are employed as the use systems, the positioning calculation processing is performed by combining the observation data of the positioning satellites of the multiple positioning systems together.

As the method of the positioning calculation processing (hereinafter referred to as a positioning method), various well-known methods such as PPP-AR (more specifically, MADOCA-PPP) and PPP-RTK can be adopted. Since a specific procedure of each positioning method is well known, a detailed description of the procedure will be omitted. PPP is an abbreviation for Precise Point Positioning (that is, single carrier phase positioning), and AR is an abbreviation for Ambiguity Resolution. MADOCA is an abbreviation for Multi-gnss Advanced Demonstration tool for Orbit and Clock Analysis. RTK is an abbreviation for Real-Time Kinematic. When the positioning calculation is performed using positioning signals of different satellite systems, a well-known integrated analysis technique may be applied.

Figure 4:
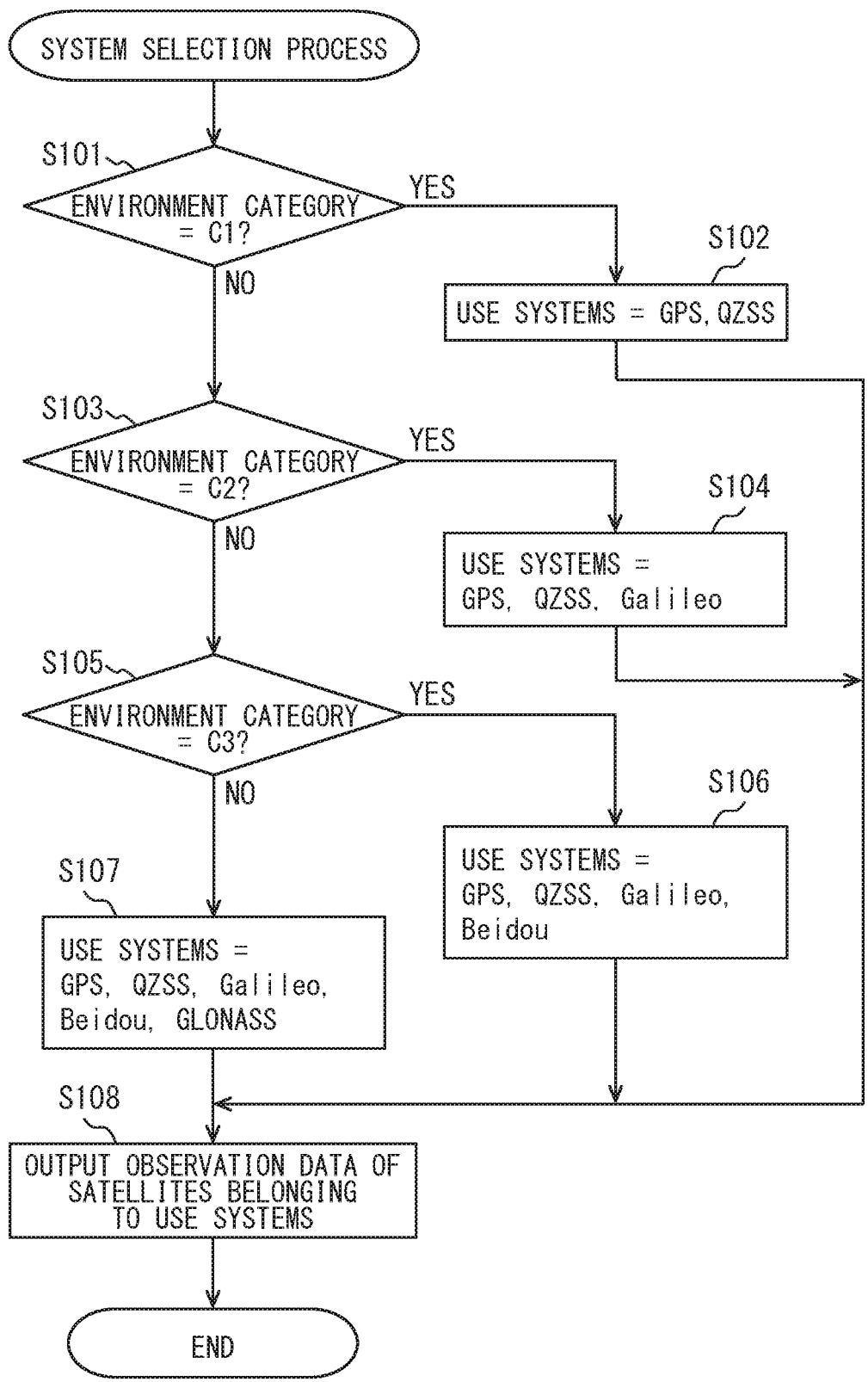
FIG. 4 is a flowchart illustrating a system selection process executed by a system selector.

Next, a system selection process performed by the system selector 17 will be described with reference to a flowchart shown in FIG. 4. The flowchart shown in FIG. 4 may be started every time observation data is input from the filter 15.

First, in S101, it is determined whether the determination result of the surrounding environment by the environment determiner 16 is the first category C1. When the result of the determination result of the surrounding environment by the environment determiner 16 is the first category C1, an affirmative determination is made in S101, and S102 is executed. In S102, the QZSS registered as the first system and the GPS registered as the second system in the system rank storage M1 are set in the use system, and the process proceeds to S108. On the other hand, when the determination result of the surrounding environment by the environment determiner 16 is not the first category C1, a negative determination is made in S101, and S103 is executed.

In S103, it is determined whether the determination result of the surrounding environment by the environment determiner 16 is the second category C2. When the result of the determination result of the surrounding environment by the environment determiner 16 is the second category C2, the affirmative determination is made in S103, and S104 is executed. In S104, the positioning systems registered as the first to third systems are set in the use systems, and the process proceeds to S108. In other words, GPS, QZSS, and Galileo are set in the use systems, and the process proceeds to S108. On the other hand, when the determination result of the surrounding environment by the environment determiner 16 is not the second category C2, a negative determination is made in S103, and S105 is executed.

In S105, it is determined whether the determination result of the surrounding environment by the environment determiner 16 is the third category C3. When the result of the determination result of the surrounding environment by the environment determiner 16 is the third category C3, the affirmative determination is made in S105, and S106 is executed. In S106, the positioning systems registered as the first to fourth systems are set in the use systems, and the process proceeds to S108. In other words, GPS, QZSS, Galileo, and BeiDou are set in the use systems, and the process proceeds to S108.

On the other hand, when the determination result of the surrounding environment by the environment determiner 16 is not the third category C3, a negative determination is made in S105, and S107 is executed. The case in which the determination result of the surrounding environment by the environment determiner 16 is not the third category C3 corresponds to the case where the determination result of the surrounding environment by the environment determiner 16 is the fourth category C4.

In S107, all the positioning systems supported by the positioning device 1 are set to the use systems, and the process proceeds to S108. In other words, GPS, QZSS, Galileo, BeiDou, and GLONASS are set in the use systems, and the process proceeds to S108.

In S108, among the observation data for each captured satellite input from the filter 15, the observation data for the captured satellite belonging to the positioning system set as the used system is output to the positioning calculator 18, and the flow ends. As the subsequent processing, the positioning calculator 18 performs the positioning calculation processing with the use of the observation data for each captured satellite provided from the system selector 17, and identifies the current position. The position information as the positioning result is output to a predetermined application.

Now, as a first comparison configuration, a positioning device is introduced in which observation data for all the captured satellites is always used for the positioning calculation processing without selecting the observation data for each captured satellite in sections of positioning systems in accordance with the surrounding environment, and the effect of the present embodiment will be described.

In the first comparison configuration, when the positioning satellites belonging to the first system and the positioning satellites belonging to the fifth system are captured in the open sky environment, the positioning calculation processing is performed by combining the respective observation data of the captured satellites belonging to the first system and the captured satellites belonging to the fifth system together.

In general, since the quality of each positioning signal is excellent in the open sky environment, sufficient information can be obtained even if the number of observation data (in other words, captured satellites) to be used is limited. In other words, in the open sky environment, the positioning with sufficiently high accuracy can be performed by only the first system. In addition, the quality and positioning accuracy of the positioning signal in the open sky environment vary depending on each positioning system. This does not mean that the positioning accuracy improves more as the number of observation data increases more.

For that reason, when the positioning calculation processing is performed by combining the observation data of the captured satellite belonging to the first system and the observation data of the captured satellite belonging to the fifth system together in the open sky environment as in the first comparison configuration, the accuracy of the final positioning result can be an intermediate level between the positioning accuracy of the first system alone and the positioning accuracy of the fifth system alone. In other words, when the fifth system is used in combination, the positioning accuracy may deteriorate as compared with the result of positioning by the first system alone.

On the other hand, according to the configuration described above, when the environment determiner 16 determines that the surrounding environment is an environment in which the multipath is less likely to be received (that is, a category having a small number), only a positioning system with relatively high accuracy is selected as the use system from among the multiple positioning systems supported by the positioning device 1. Specifically, the positioning calculation processing is performed using only the first system and the second system. As a result, the observation data about the captured satellite which is likely to contain an error is discarded, and the observation data used in the positioning calculation processing becomes the observation data about the captured satellite of the positioning system which is relatively high in accuracy.

In other words, this makes it possible to reduce the possibility that observation data including errors are mixed in the observation data group used in the positioning calculation processing. According to the control mode described above, the possibility that the positioning accuracy is deteriorated due to an increase in the number of observation data can be reduced, and the positioning result with higher accuracy can be output as compared with the first comparison configuration.

In general, in the multipath environment such as an urban area, the quality of each positioning signal is deteriorated, and therefore, in general, if the number of observation data is small, there is a shortage of information. In the present embodiment, when it is determined by the environment determiner 16 that the surrounding environment is an environment in which the multipath is likely to occur (that is, a category having a large number), a positioning system having relatively poor accuracy in the use area, such as the fifth system, is also adopted as the use system. As a result, the number of captured satellites (in other words, observation data) that can be used for the positioning calculation processing can be increased, thereby being capable of reducing the possibility that information is short. As a result, the positioning accuracy can be maintained or improved as compared with the first comparison configuration. As described above, according to the configuration of the present embodiment, in the configuration in which the positioning calculation processing is performed by using multiple GNSSs together (that is, a multi-GNSS positioning device), the positioning accuracy can be enhanced or the positioning accuracy can be maintained at a high level by selectively using GNSSs according to the surrounding environments.

Further, in the above configuration, the category of the surrounding environment is determined based on the deletion rate R determined according to the reception state of the positioning signal. As another configuration for determining the category of the surrounding environment (hereinafter referred to as a second comparison configuration), a configuration using map data is also conceivable. However, in the configuration described above, the positioning device needs to have a storage device in which map data is stored or a function of communicating with an external server to acquire map data, which increases the cost accordingly. On the other hand, since the environment determiner 16 of the present embodiment determines the category of the surrounding environment based on the deletion rate R determined according to the reception state of the positioning signal, the positioning device 1 does not need to have a function of communicating with a device that stores the map data or an external server. In other words, according to the present embodiment, the manufacturing cost can be reduced more than the second comparison configuration. The present disclosure can also be applied to a device that does not include a module for wide area communication.

In the case where 5 observation data are deleted when the number of captured satellites is 10 (hereinafter referred to as the first case) and the case where the 5 observation data are deleted when the number of captured satellites is 30 (hereinafter referred to as the second case), even if the number of deleted observation data is the same, the degree of occurrence of multipath is different. Naturally, this suggests that the first case is an environment in which the multipath is likely to occur (in other words, an environment in which there are a large number of structures around). In view of the circumstances described above, if it is attempted to determine the surrounding environment by the number of deletions of observation data, there is a relatively high possibility that the surrounding environment is erroneously determined. On the other hand, as in the configuration of the present embodiment, the environment determiner 16 can reduce the possibility of erroneous determination of the surrounding environment by determining the category of the surrounding environment based on the deleted ratio (that is, the deletion rate R) instead of the number of pieces of deleted observation data. In other words, with the use of the deletion rate R instead of the number of deletions of observation data as an index for discriminating the surrounding environment, the surrounding environment can be discriminated more accurately.

While the embodiments of the present disclosure have been described above, the present disclosure is not limited to the embodiments described above, and various modifications described below are included in the technical scope of the present disclosure, and may be implemented by various modifications within a scope not departing from the spirit described below. Needless to say, various modifications can be implemented by appropriately combining those modification together.

Note that members having the same functions as those described in the above embodiment are denoted by the same reference numerals, and duplicated descriptions of the same members will be omitted. When only a part of the configuration is referred to, the configuration of the embodiment described above can be applied to other parts.

Modification 1

The positioning device 1 may learn a positioning system or the like corresponding to the first system based on the history of the result of the filtering process of the filter 15, and may change the rank of each positioning system registered in the system rank storage M1 as needed. In this example, a configuration based on the above concept will be described as Modification 1.

Figure 5:
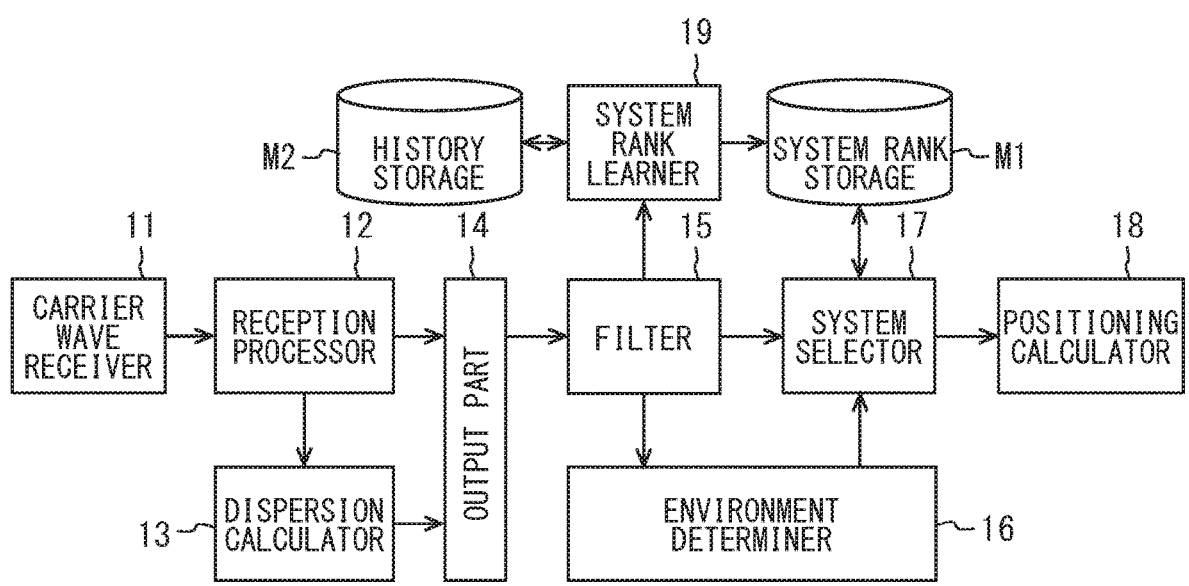
FIG. 5 is a block diagram showing an example of a schematic configuration of a positioning device in Modification 1.

The positioning device 1 according to Modification 1 further includes a system rank learner 19 and a history storage M2 in addition to the configuration of the above-described embodiment as shown in FIG. 5. The history storage M2 is a storage device realized by using a rewritable nonvolatile storage medium. The system rank learner 19 may be a functional block embodied by the CPU executing the positioning program. It is needless to say that the system rank learner 19 may be embodied by a hardware.

Figure 6:
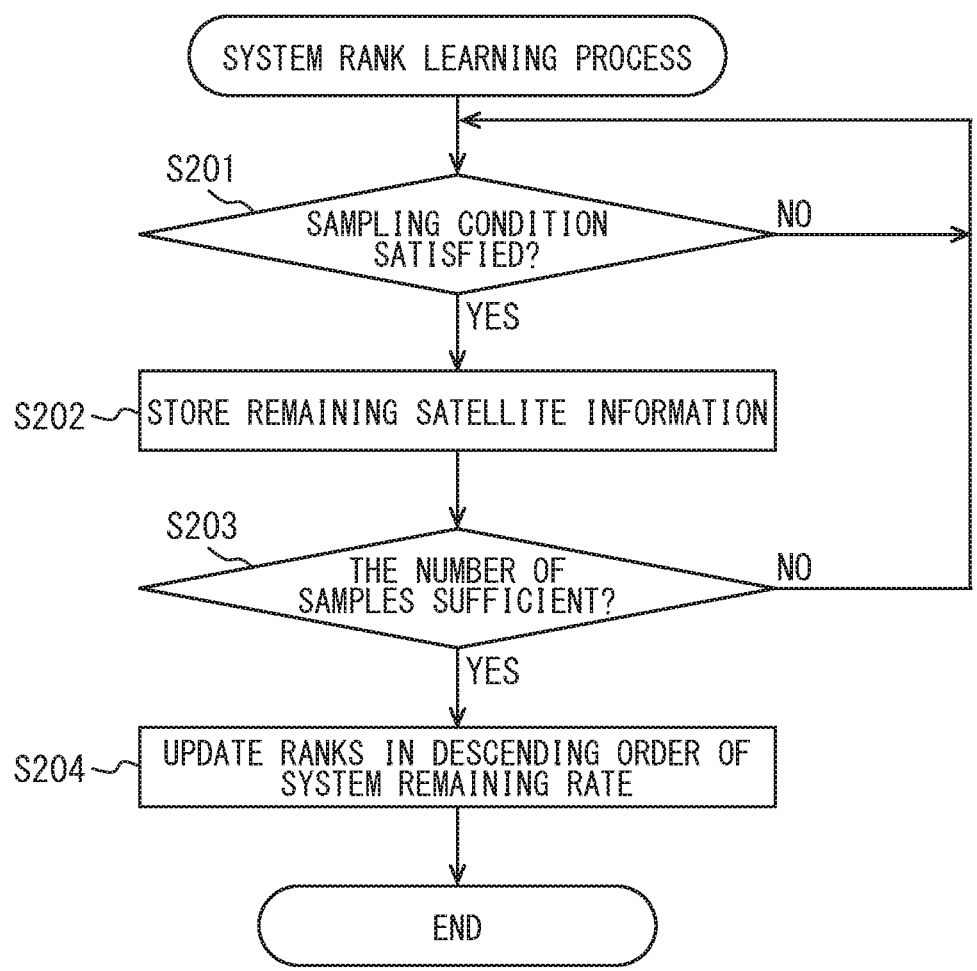
FIG. 6 is a flowchart illustrating a system rank learning process.

The system rank learner 19 is configured to identify (in other words, learn) a positioning system corresponding to the first system, a positioning system corresponding to the fifth system, and the like, based on the history of the result of the filtering process of the filter 15. A specific operation of the system rank learner 19 will be described with reference to a flowchart shown in FIG. 6. A flowchart shown in FIG. 6 shows an example of a procedure of processing (hereinafter referred to as a rank learning process) executed by the system rank learner 19. The system rank learner 19 sequentially executes a rank learning process to identify a positioning system corresponding to the first system and a positioning system corresponding to the fifth system. Each step of the flowchart shown in FIG. 6 is executed by the system rank learner 19.

First, in S201, it is determined whether a predetermined sampling condition is satisfied. The sampling condition is a condition that specifies a situation in which the sampling process of S202 is executed. For example, the sampling condition may be, for example, a case in which a predetermined sample time has elapsed since a previous sampling process has been performed. It is preferable that the sample time is set to be relatively longer than an interval at which the filter 15 outputs the observation data. For example, 1 minute, 10 minutes, 1 hour, or the like is preferable. Further, the sampling condition may include that the environment determiner 16 determines that the category of the surrounding environment corresponds to an intermediate category (for example, C2 to C3).

If the sampling condition is satisfied, the determination is made in S201 and S202 is executed. On the other hand, when the sampling condition is not satisfied, a negative determination is made in S201 and the sampling condition is put in a waiting state, and after a predetermined period of time has elapsed, S201 is executed again.

In S202, as a sampling process, the satellite numbers of the captured satellites (that is, the remaining satellites) corresponding to the observation data remaining as a result of the filtering process by the filter 15 are sequentially acquired from the filter 15 as remaining satellite information. At the same time, the satellite number of the captured satellite (hereinafter referred to as deleted satellite) corresponding to the observation data deleted by the filtering process by the filter 15 is acquired from the filter 15 as deleted satellite information. Then, a time stamp indicating an acquisition time is added to the remaining satellite information and the deleted satellite information, and the time stamp is stored in the history storage M2. In this manner, the sampling process corresponds to a process of sampling the result of the filtering process.

S202 is repeatedly performed each time a predetermined sampling condition is satisfied. The remaining satellite information acquired at a certain point in time is handled as one data set, and is handled separately from the remaining satellite information acquired at another point in time. The multiple pieces of the remaining satellite information having different acquisition times may be sorted in chronological order and stored in the memory so that the latest data becomes a head. When the number of pieces of stored data exceeds a predetermined number, the data may be sequentially discarded from the oldest data. In this manner, data indicating the history of the remaining satellites is stored in the history storage M2.

As with the remaining satellite information, the deleted satellite information acquired at a certain point in time is handled as one data set, and is handled separately from the deleted satellite information acquired at another point in time. The multiple pieces of deleted satellite information having different acquisition times may be sorted in chronological order and stored in the memory so that the latest data becomes the head. In this manner, data indicating the history of the deleted satellite is stored in the history storage M2.

In S203, it is determined whether the result of the sampling process is stored in the history storage M2 a predetermined number of times (for example, 50 times) or more. In other words, it is determined whether 50 or more sets of remaining satellite information and deleted satellite information are stored. If the result of the sampling process is stored a predetermined number of times or more, an affirmative determination is made in S203, and S204 is executed. On the other hand, when the result of the sampling process of the predetermined number of times or more is not stored, a negative determination is made in S203, and the process returns to S201.

In S204, by referring to the history of the remaining satellite information, a ratio of remaining positioning satellites belonging to the positioning system as a result of the filtering process (hereinafter referred to as system remaining rate) is calculated for each positioning system, and the ranks of the positioning systems are determined in descending order of the system remaining rate. For example, the positioning system having the highest system remaining rate is set to the first system. The positioning system with the lowest system remaining rate is set to the fifth system. This is because the fact that the system remaining rate is high suggests that the positioning system is less likely to be affected by the multipath or the like. Then, the data stored in the system rank storage M1 is rewritten.

Figure 7:
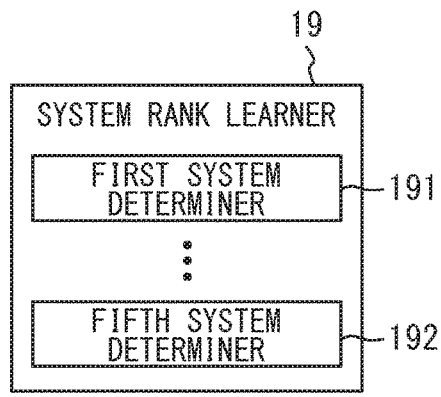
FIG. 7 is a block diagram showing a schematic configuration of a system rank learner.

FIG. 7 is a block diagram showing a schematic configuration of the system rank learner 19. The first system determiner 191 is configured to set the positioning system having the highest system remaining rate to the first system in S204 described above. The first system determiner 191 corresponds to a high-accuracy system identifier. The fifth system determiner 192 is configured to set the positioning system having the lowest system remaining rate to the fifth system in S204 described above. The fifth system determiner 192 corresponds to a low-accuracy system identifier.

According to the configuration described above, a designer can omit a labor of generating system rank data for each area based on a test or the like. This also makes it possible to flexibly cope with the case where the superiority or inferiority of the accuracy between the positioning systems is interchanged due to a change in the operation situation of the positioning systems (for example, addition or deletion of positioning satellites).

The system rank learner 19 may calculate, for each positioning system based on the history of the deleted satellite information, a rate at which the positioning satellites belonging to the positioning system are deleted as a result of the filtering process (hereinafter referred to as the system deletion rate), and may determine the rank of the positioning system in ascending order of the system deletion rate. For example, the positioning system having the lowest system deletion rate may be set to the first system, and the positioning system having the highest system remaining rate may be set to the fifth system. The same effects can be obtained by such an embodiment.

Modification 2

Figure 8:
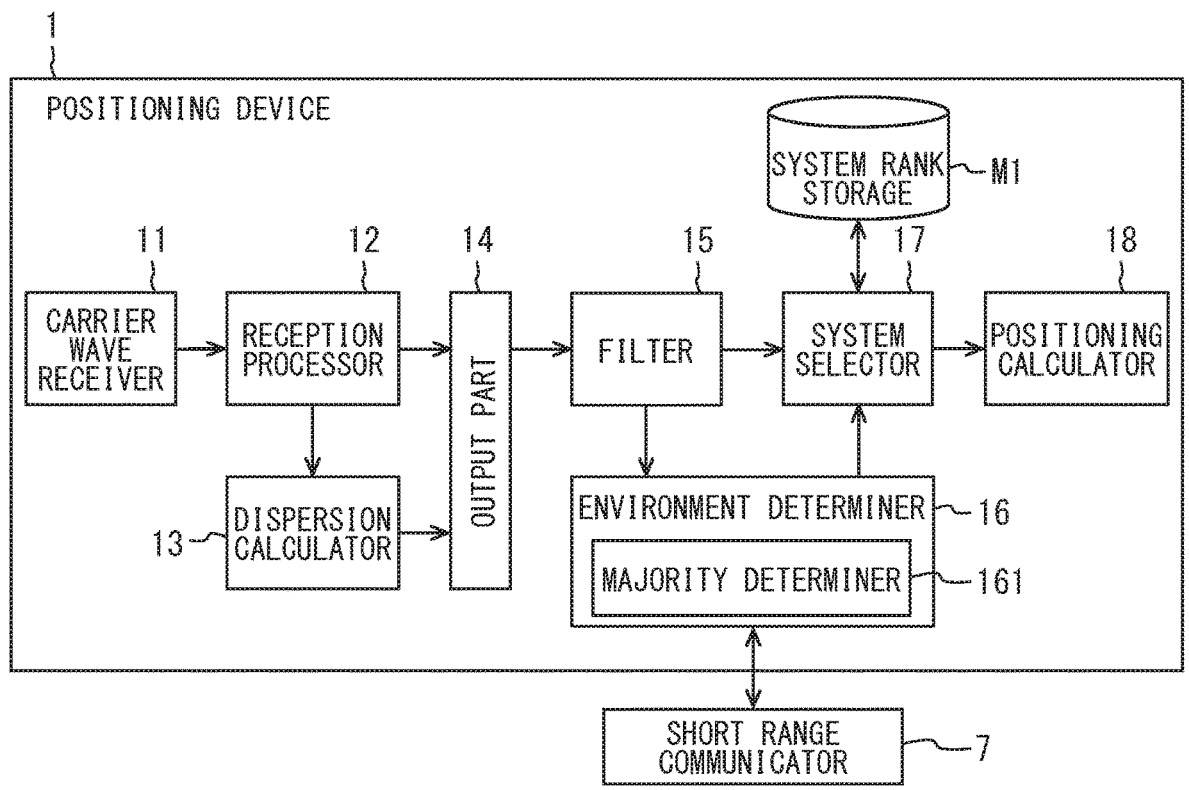
FIG. 8 is a block diagram showing an example of a schematic configuration of a positioning device in Modification 2.

As shown in FIG. 8, when the positioning device 1 is connected to a short range communicator 7, which is a communication module for performing a direct wireless communication (hereinafter referred to as a short range communicator) with another device existing in the surrounding of the positioning device 1 using radio waves of a predetermined frequency band, so as to be able to mutually communicate with each other, the positioning device 1 may acquire the determination result of the surrounding environment of another device through the short range communicator 7, and may finally determine the category of the current surrounding environment by majority decision. According to the configuration described above, the positioning device 1 can correct the error when only a subject device (i.e., an own device) erroneously determines the category of the surrounding environment for some reason. In other words, the accuracy and reliability of the category to be finally used can be enhanced.

Hereinafter, a configuration based on the above concept will be described as Modification 2. In other words, the short range communication described above is a communication not through a wide area communication network. As an example, the short range communicator 7 is a communication module for performing a direct communication with other vehicles existing in the surrounding of the vehicle Hv (that is, vehicle-to-vehicle communication) based on the fact that the positioning device 1 is mounted on a vehicle.

The frequency band used for the vehicle-to-vehicle communication is, for example, a 760 MHz band. In addition, a 2.4 GHz band, a 5.9 GHz band, or the like can be used. Any communication standard for realizing the vehicle-to-vehicle communication can be adopted. For example, the standard of WAVE (Wireless Access in Vehicular Environment) disclosed in IEEE1609 and the like can be adopted.

The short range communicator 7 as a communication module for the vehicle-to-vehicle communication is configured to be able to communicate with other vehicles existing within a radius of several hundred meters centered on the subject vehicle Hv. As an example, the short range communicator 7 is a communication module that provides a wireless communication function conforming to the vehicle-to-vehicle communication standard in which the communication range is about several hundred meters, but the present disclosure is not limited to the above example. As another embodiment, the short range communicator 7 may be a communication module that performs a communication (hereinafter referred to as a short-range communication) based on a predetermined short-range wireless communication standard in which the communication range is, for example, at most, about several tens of meters. For example, Bluetooth Low Energy (Bluetooth is a registered trademark), Wi-Fi (registered trademark), ZigBee (registered trademark), or the like, corresponds to the short-range wireless communication standard described above.

The short range communicator 7 broadcasts a determination result packet indicating category information (for example, category number) indicating the category determined by the environment determiner 16 of the subject device based on a request from the positioning device 1 (particularly, the environment determiner 16). When the determination result packet transmitted from another vehicle is received, data indicated in the determination result packet is provided to the positioning device 1. As a precondition, the environment determiner 16 according to Modification 2 generates a determination result packet every time the determination of the category of the surrounding environment is performed based on the deletion rate input from the filter 15, outputs the determination result packet to the short range communicator 7, and broadcasts the determination result packet.

The determination result packet is a communication packet including information indicating a determination result of the surrounding environment (for example, a category number), and position information as a calculation result of the positioning calculator 18. As a more preferable mode, the determination result packet includes information indicating a transmission time, a traveling speed, and a traveling direction of the communication packet in addition to the category number and the current position information.

Figure 9:
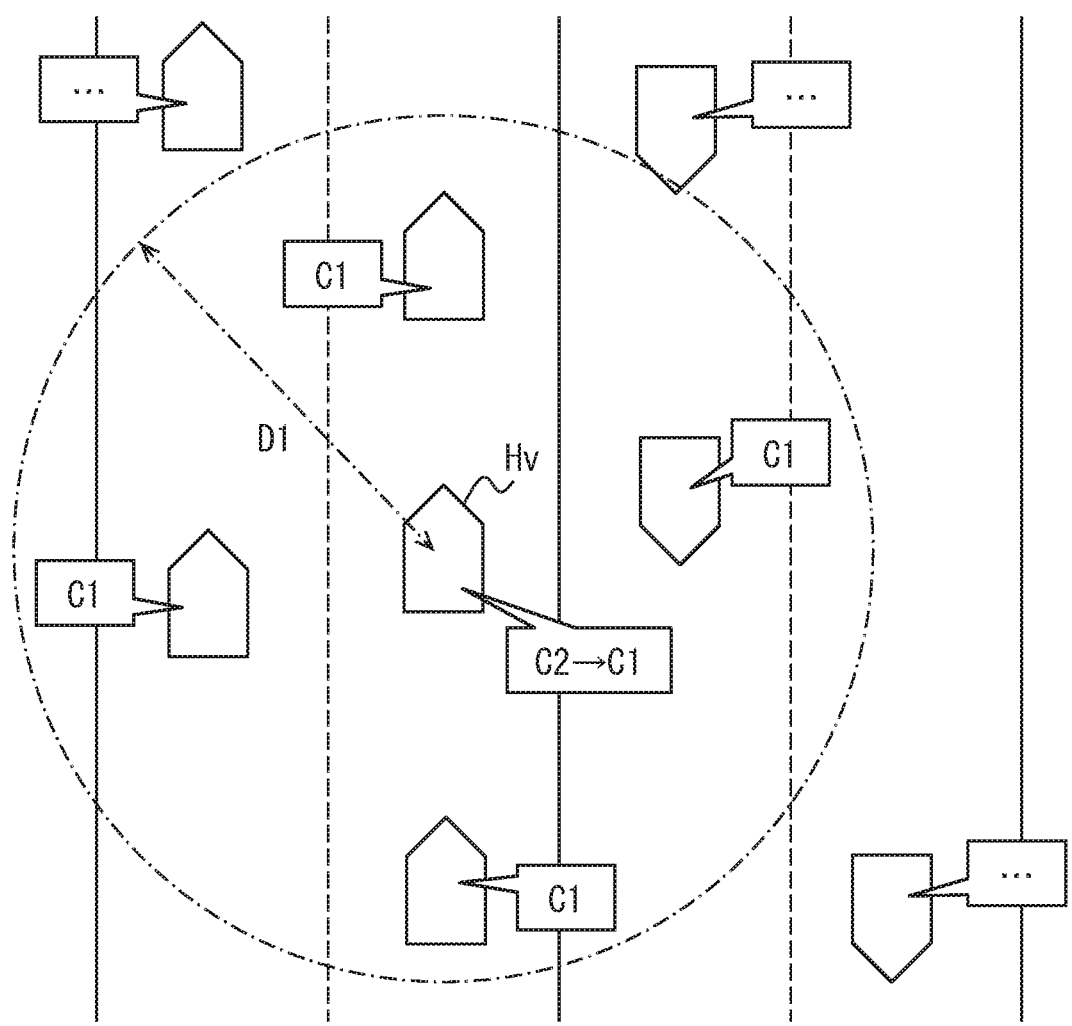
FIG. 9 is a diagram illustrating an operation of an environment determiner in Modification 2.

As shown in FIG. 9, the environment determiner 16 in the present modification sequentially acquires determination results of other vehicles (hereinafter, surrounding vehicles) existing within a predetermined distance D1 from the subject vehicle Hv in cooperation with the short range communicator 7. In addition, the environment determiner 16 includes a majority determiner 161. The majority determiner 161 finally determines which category the surrounding environment corresponds to by a majority decision using the respective determination results of the surrounding vehicle and the subject vehicle Hv.

For example, as shown in FIG. 9, when as the determination result of the surrounding vehicle, the determination result indicating that the surrounding environment is the first category C1 is the majority in the situation where it is determined that the surrounding environment of the subject vehicle is the second category C2, the majority determiner 161 finally determines that the surrounding environment is the first category C1. In other words, the determination result of the subject vehicle that the surrounding environment is the second category C2 is discarded, and the category of the surrounding environment is determined as the first category.

It is preferable that a distance D1 is set to a value sufficiently smaller than the distance that can be communicated between the vehicles, such as several tens of meters (for example, 15 m). This is because there is a high possibility that the surrounding environment of other vehicles traveling in a place distant from the own vehicle Hv is different from the surrounding environment of the subject vehicle Hv. Among the other vehicles performing vehicle-to-vehicle communication, the other vehicle corresponding to the surrounding vehicle may be extracted using the current position of the subject vehicle Hv and the current position of the transmission source vehicle. A transmission source vehicle whose current position is within the distance D1 from the subject vehicle Hv may be adopted as a surrounding vehicle. The positioning device 1 mounted on the subject vehicle Hv corresponds to the subject device, and the positioning device 1 mounted on the surrounding vehicle corresponds to a peripheral device.

According to the configuration of Modification 2, as described above, the positioning device 1 can correct the error when only the subject device 1 erroneously determines the category of the surrounding environment for some reason. As a result, the accuracy and reliability of the category to be finally used can be enhanced.

The majority determiner 161 may adopt the majority decision result in the surrounding environment only when the most frequent category, which is the determination result of the largest number of appearances (in other words, the majority) among the determination result of the surrounding vehicle and the determination result of the subject vehicle Hv, exceeds half of a total. This is because the fact that the most frequent category does not exceed half of the total means that the determination results of the respective vehicles (more specifically, the positioning devices 1) split, and the determination result of the majority is not always the correct determination result. In other words, the determination accuracy of the surrounding environment can be enhanced by employing the determination result of the majority only when the determination result of the majority exceeds half of the total. In addition, it can also be reduced a possibility that an erroneous determination result is adopted as a final category due to being induced by the determination result of the surrounding vehicle even though the subject device can correctly determine the surrounding environment.

Figure 10:
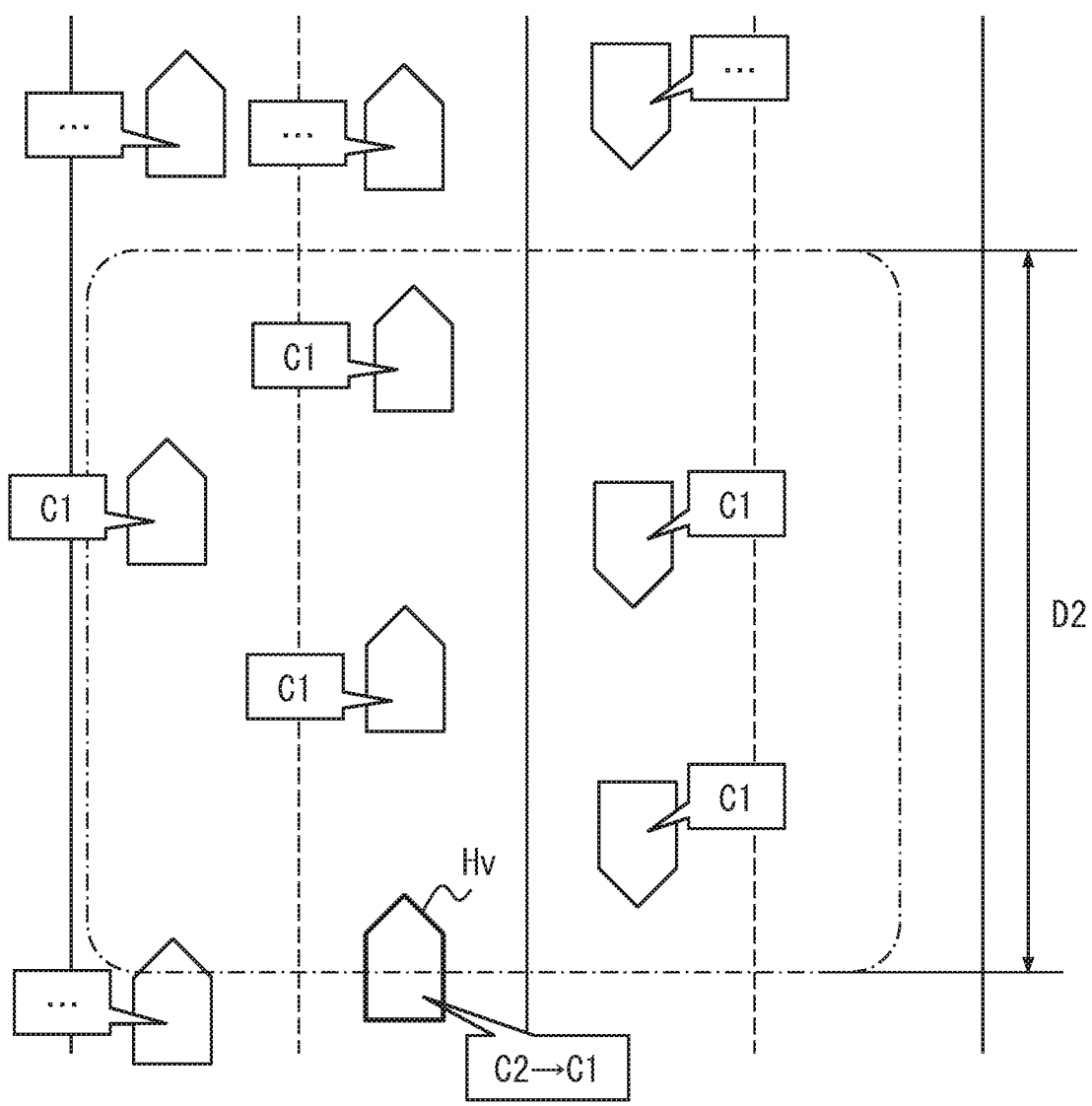
FIG. 10 is a diagram illustrating another operation of the environment determiner in Modification 2.

In the configuration described above, a mode in which the final surrounding environment is determined by using the determination result of the other vehicle located within a distance D1 from the subject vehicle Hv is disclosed, but the present disclosure is not limited to the above example. As shown in FIG. 10, the final surrounding environment may be determined by using the determination result of another vehicle which is in front of the vehicle Hv and within a distance D2 from the subject vehicle Hv among the vehicles which are performing the vehicle-to-vehicle communication (in other words, as a population).

The reason is as follows. The deletion rate R for determining the category changes according to the pseudo distance dispersion, which is a statistical index determined based on the observation data within a predetermined period of time in the past. Even if the actual surrounding environment changes, the change does not appear as a change in the deletion rate R until the pseudo distance dispersion exceeds a predetermined deletion threshold. In other words, it takes time according to the number of pieces of data for calculating the pseudo distance dispersion before the actual change in the surrounding environment is reflected in the determination result of the environment determiner 16.

In view of the above property, there is a high possibility that the determination result of the other vehicle traveling in front of the subject vehicle Hv correctly determines the surrounding environment of the subject vehicle Hv more than the determination result of the other vehicle traveling behind the subject vehicle Hv. Therefore, the category of the final surrounding environment is determined with the use of the determination result of the other vehicle existing in front of the subject vehicle Hv and within the distance D2 from the subject vehicle Hv, thereby being capable of improving the determination accuracy of the category. The distance D2 may have the same value as the distance D1.

Further, for example, the category of the final surrounding environment may be determined with the use of only the determination result of the other vehicle having the same traveling direction as that of the subject vehicle Hv among the other vehicles traveling in front of the subject vehicle Hv and the determination result of the subject vehicle Hv.

Further, the surrounding environment is different between an expressway and a general road (hereinafter referred to as a road along the expressway) located under the highway. Naturally, the skyward view is better on the expressway and the skyward view is worse on the road along the expressway. Taking such an issue into consideration, it is preferable to determine the category of the final surrounding environment with the use of the determination result of the subject vehicle Hv of the other vehicle that is traveling on the same type of road as that of the subject vehicle Hv among the other vehicles traveling around the subject vehicle Hv. Whether the vehicle is traveling on a road of the same type as that of the subject vehicle Hv may be identified by sharing the type of the traveling road by a vehicle-to-vehicle communication, or may be determined based on height information included in the position information. Further, since a significant difference occurs in the traveling speed between the expressway and the general road, it can be determined whether the traveling speed is at the same level (for example, ±10 kilometers or less).

Modification 3

In the embodiment described above, the positioning device 1 corresponds to five positioning systems, but the present disclosure is not limited to the above configuration. The number of positioning systems supported by the positioning device 1 may be only two. For example, the positioning systems supported by the positioning device 1 may be two systems, i.e., BeiDou and GLONASS. The number of positioning systems supported by the positioning device 1 may be three. For example, the positioning systems supported by the positioning device 1 may be three, i.e., GPS, QZSS, and GLONASS. In other words, the number of positioning systems supported by the positioning device 1 may be 2, 3, 4, 6, or the like. In addition, the system may correspond to a positioning system other than the positioning system described above, such as the Indian IRNSS (Indian Regional Navigation Satellite System).

The positioning system to which the positioning device 1 in this example conforms refers to a system in which the positioning device 1 can receive the positioning signal of the positioning system and can execute the positioning calculation processing using the positioning signal of the positioning system. A positioning signal of a certain positioning system corresponds to a positioning signal transmitted from a positioning satellite configuring the positioning system.

The flowcharts or the processes of the flowcharts described in the present disclosure are configured by multiple sections (or steps), and each section is represented as S101, for example. Furthermore, each section may be divided into a plurality of sub-sections, while a plurality of sections may be combined into one section. In addition, each section configured in this manner may be referred to as a circuit, a device, a module, or a means.

Although the present disclosure has been described in accordance with the examples, it is understood that the present disclosure is not limited to such examples or structures. The present disclosure encompasses various modifications and variations within the scope of equivalents. In addition, various combinations and configurations, as well as other combinations and configurations that include only one element, more, or less, fall within the scope and spirit of the present disclosure.

What is claimed is:
1. A positioning device comprising:
  a signal receiver configured to receive a plurality of positioning signals transmitted from a plurality of positioning satellites respectively provided by a plurality of positioning systems;
  an index value calculator configured to sequentially calculate, as an index value for determining whether in a multipath environment, at least one of a Doppler shift amount and a pseudo distance of each of the positioning satellites based on each of the positioning signals received by the signal receiver;
  a dispersion calculator configured to calculate an index value dispersion indicating a degree of variation of the index value calculated by the index value calculator for each of captured satellites which are the positioning satellites from which the signal receiver is capable of receiving the positioning signals;
  a satellite selector configured to set a non-use satellite not to be used in a positioning calculation processing among the captured satellites based on the index value dispersion calculated by the dispersion calculator for each of the captured satellites;
  an environment determiner configured to determine whether a surrounding environment is an environment in which a multipath is likely to occur based on a deletion rate which is a ratio of the number of the captured satellite set as the non-use satellite by the satellite selector to a total number of the captured satellites;
  a system selector configured to select one or more use systems to be used in the positioning calculation processing from the positioning systems according to a determination result of the environment determiner;
  a positioning calculator configured to perform the positioning calculation processing by using the positioning signals from the positioning satellites provided by the positioning systems selected as the use systems by the system selector among remaining satellites which are the captured satellites not set as the non-use satellite by the satellite selector; and a device rank storage in which data indicating a ranking of average positioning accuracies of the positioning systems supported by the positioning device is registered, wherein when the environment determines that the surrounding environment is not the environment in which the multipath is likely to occur based on the deletion rate, the system selector does not set a low-accuracy system, which is registered in the device rank storage as the positining system having a lowest positioning accuracy among the positioning systems, as the use system, and sets one or more high-accuracy systems, which are registered in the device rank storage as the positioning systems having higher positioning accuracies than the low-accuracy system, as the use systems, and the positioning calculator does not use the positioning signal from the positioning satellite belonging to the low accuracy system in the positioning calculation processing.

2. The positioning device according to claim 1, wherein a plurality of categories is set in stages in advance according to a likelihood of occurrence of the multipath, the categories include at least an open sky category, which is a category corresponding to an open sky environment in which the multipath is least likely to occur, and an urban category, which is a category corresponding to an urban area in which the multipath is most likely to occur, the environment determiner determines which of the categories the surrounding environment corresponds to based on the deletion rate, and the system selector is configured to increase the number of positioning systems selected as the use systems when the surrounding environment determined by the environment determiner is a category in which the multipath is more likely to occur.

3. The positioning device according to claim 2, wherein when the environment determiner determines that the surrounding environment is the open sky category, the system selector selects a high-accuracy system, which is registered as the positioning system having a highest positioning accuracy among the positioning systems in the system rank storage, as the use system and does not select the low-accuracy system as the use system, and when the environment determiner determines that the surrounding environment is the urban category, the system selector selects all the positioning systems including the low accuracy system as the use systems.

4. The positioning device according to claim 2, wherein a subject device as the positioning device is configured to be mutually communicably connected to a short range communicator for directly communicating with a peripheral device which is another positioning device existing within a predetermined distance from the subject device, the environment determiner is configured to broadcast category information indicating the category determined by the environment determiner of the subject device based on the deletion rate to the peripheral device in cooperation with the short range communicator, and the positioning device further comprises a majority determiner that acquires the category of the surrounding environment determined by the peripheral device in cooperation with the short range communicator and finally determines which of the categories the surrounding environment corresponds to according to a majority decision using determination results of the peripheral device and the subject device.

5. The positioning device according to claim 4, wherein when a number of appearances of a most frequent category, which is the determination result having a largest number of appearances among the determination results of the peripheral device and the subject device, exceeds half of a total, the majority determiner determines that the surrounding environment corresponds to the most frequent category, and when the number of appearances of the most frequent category does not exceed half of the total, the majority determiner employs the determination result of the subject device as a final surrounding environment.

6. The positioning device according to claim 1, further comprising a high-accuracy system identifier configured to identify the positioning system having a highest positioning accuracy among the positioning systems based on a result of a filtering process which is a process for selecting the non-use satellite by the satellite selector, and configured to register, as a high-accuracy system, the positioning system that is identified in the system rank storage, wherein the result of the filtering process includes a satellite number of the captured satellite corresponding to an observation data remaining as a result of the filtering process for a fixed number of times or a satellite number of the captured satellite corresponding to an observation data deleted by the filtering process for the fixed number of times.

7. The positioning device according to claim 1, further comprising a low-accuracy system identifier configured to identify the positioning system having the lowest positioning accuracy among the positioning systems based on a result of a filtering process which is a process for selecting the non-use satellite by the satellite selector, and configured to register, as the low-accuracy system, the positioning system that is identified in the system rank storage, wherein the result of the filtering process includes a satellite number of the captured satellite corresponding to an observation data remaining as a result of the filtering process for a fixed number of times or a satellite number of the captured satellite corresponding to an observation data deleted by the filtering process for the fixed number of times.

8. The positioning device according to claim 1, wherein part or all of the signal receiver, the index value calculator, the dispersion calculator, the satellite selector, the environment determiner, the system selector, and the positioning calculator are realized by software executed by a processor, or hardware, or cooperation of the software and the hardware.

9. A positioning device comprising a processor, a memory, and a device rank storage in which data indicating a ranking of average positioning accuracies of a plurality of positioning systems supported by the positioning device is registered, wherein the memory stores instructions configured to, when executed by the processor, cause the processor to:

receive a plurality of positioning signals transmitted from a plurality of positioning satellites respectively provided by a plurality of positioning systems;

sequentially calculate, as an index value for determining whether in a multipath environment, at least one of a Doppler shift amount and a pseudo distance of each of the positioning satellites based on each of the positioning signals that are received;

calculate an index value dispersion indicating a degree of variation of the index value calculated for each of captured satellites which are the positioning satellites from which the positioning signals are received;

set a non-use satellite not to be used in a positioning calculation processing among the captured satellites based on the index value dispersion calculated for each of the captured satellites;

determine whether a surrounding environment is an environment in which a multipath is likely to occur based on a deletion rate which is a ratio of the number of the captured satellite set as the non-use satellite to a total number of the captured satellites;

select one or more use systems to be used in the positioning calculation processing from the positioning systems according to a determination result of the surrounding environment;

perform the positioning calculation processing by using the positioning signals from the positioning satellites provided by the positioning systems selected as the use systems among remaining satellites which are the captured satellites not set as the non-use satellite;

not set a low-accuracy system, which is registered in the device rank storage as the positioning system having a lowest positioning accuracy among the positioning systems, as the use system, and set one or more high-accuracy systems, which are registered in the device rank storage as the positioning systems having higher positioning accuracies than the low-accuracy system, as the use systems, when determining that the surrounding environment is not the environment in which the multipath is likely to occur based on the deletion rate; and not use the positioning signal from the positioning satellite belonging to the low accuracy system in the positioning calculation processing.

10. A positioning method comprising:

receiving a plurality of positioning signals transmitted from a plurality of positioning satellites respectively provided by a plurality of positioning systems;

sequentially calculating, as an index value for determining whether in a multipath environment, at least one of a Doppler shift amount and a pseudo distance of each of the positioning satellites based on each of the positioning signals that are received;

calculating an index value dispersion indicating a degree of variation of the index value for each of captured satellites which are the positioning satellites from which the positioning signals are received;

setting a non-use satellite not to be used in a positioning calculation processing among the captured satellites based on the index value dispersion calculated for each of the captured satellites;

determining whether a surrounding environment is an environment in which a multipath is likely to occur based on a deletion rate which is a ratio of the number of the captured satellite set as the non-use satellite to a total number of the captured satellites;

selecting one or more use systems to be used in the positioning calculation processing from the positioning systems according to a determination result of the surrounding environment;

performing the positioning calculation processing by using the positioning signals from the positioning satellites provided by the positioning systems selected as the use systems among remaining satellites which are the captured satellites not set as the non-use satellite;

not setting a low-acuracy system, which is registered in a device rank storage as the positioning system having a lowest positioning accuracy among the positioning systems, as the use system, and setting one or more high-accuracy systems, which are registered in the device rank storage as the positioning systems having higher positioning accuracies than the low-accuracy system, as the use systems, when determining that the surrounding environment is not the environment in which the multipath is likely to occur based on the deletion rate; and not using the positioning signal from te positioning satellite belonging to the low accuracy system in the positioning calculation processing.

* * * * *